United States Patent
Greer, Jr. et al.

(10) Patent No.: US 6,698,071 B1
(45) Date of Patent: Mar. 2, 2004

(54) CLIP SYSTEMS AND METHODS FOR SHEET MATERIALS

(75) Inventors: Lester R. Greer, Jr., Bellingham, WA (US); Randal W. Hanson, Bellingham, WA (US); Wilfred Joseph Hoffmann, Blaine, WA (US)

(73) Assignee: Homax Products, Inc., Bellingham, WA (US)

( * ) Notice: Subject to any disclaimer, the term of this patent is extended or adjusted under 35 U.S.C. 154(b) by 0 days.

(21) Appl. No.: 10/370,644

(22) Filed: Feb. 19, 2003

Related U.S. Application Data

(60) Provisional application No. 60/358,455, filed on Feb. 19, 2002, and provisional application No. 60/423,111, filed on Nov. 1, 2002.

(51) Int. Cl.[7] ............................................. A44B 21/00
(52) U.S. Cl. ............................ 24/537; 24/507; 24/513; 24/515; 24/519; 24/522; 24/561; 24/565
(58) Field of Search ........................ 24/537, 513, 515, 24/521, 522, 540, 565, 568, 526, 519, 507, 545, 561, 562, 564, 571

(56) References Cited

U.S. PATENT DOCUMENTS

| | | | | |
|---|---|---|---|---|
| 124,071 A | * | 2/1872 | Lipsey .......................... | 24/537 |
| 523,136 A | * | 7/1894 | Trakofler ....................... | 24/537 |
| 2,540,237 A | * | 2/1951 | Bevin, II ....................... | 24/522 |
| 3,100,324 A | * | 8/1963 | Tutino et al. .................. | 24/537 |
| 3,924,303 A | * | 12/1975 | Elliott ........................... | 24/537 |
| 3,982,307 A | * | 9/1976 | Smith et al. ................... | 24/507 |
| 4,077,092 A | * | 3/1978 | Basevi .......................... | 24/519 |
| 4,566,157 A | * | 1/1986 | Packendorff .................. | 24/536 |
| 5,388,313 A | | 2/1995 | Cameron | |

* cited by examiner

*Primary Examiner*—Victor Sakran
(74) *Attorney, Agent, or Firm*—Michael R. Schacht; Schacht Law Office, Inc.

(57) ABSTRACT

A clip for sheet materials comprising a clip member and a collar member. The clip member is made of resilient material such that the clip member may be deformed from a normally open configuration into a closed position. The clip member defines first and second finger portions that do not engage each other when the clip member is in the open configuration and engage each other when the clip member is in the closed position. The collar member defines at least one latch portion, a lever portion, and a housing interior. The collar member is made of resilient material such that applying a force to the lever portion causes the collar member to deform from a normally engaged configuration to a disengaged configuration.

6 Claims, 16 Drawing Sheets

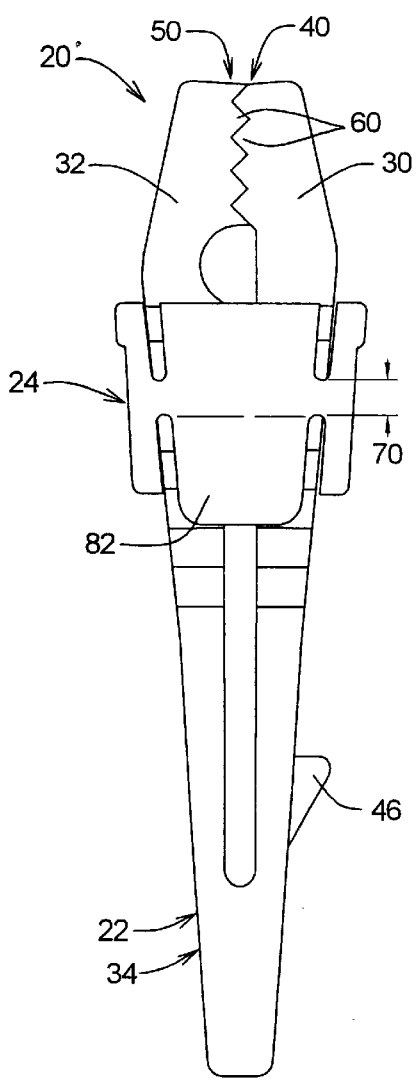
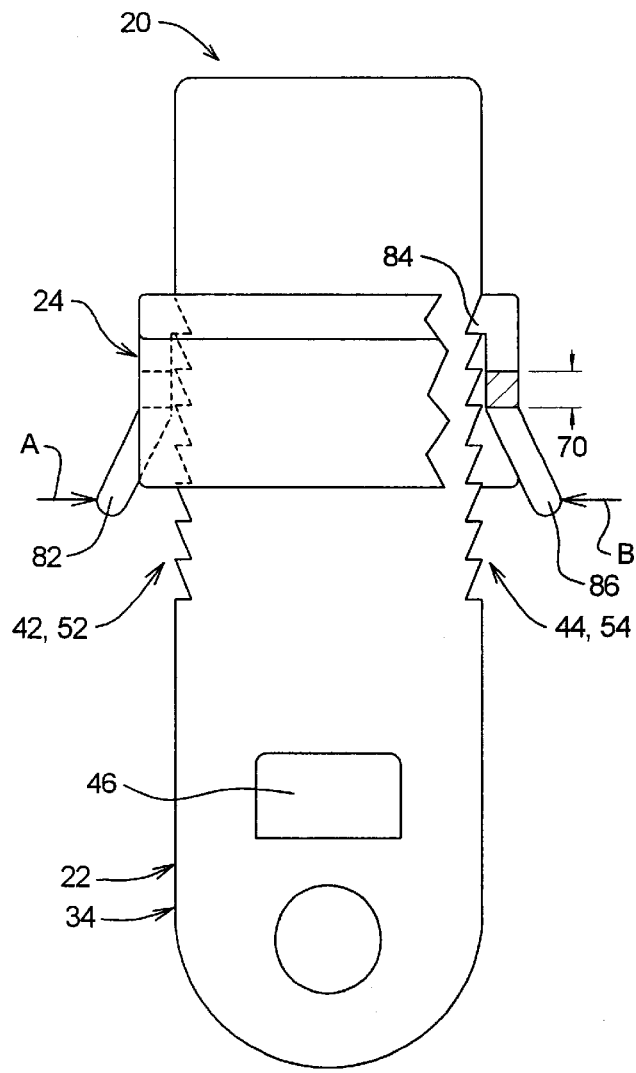

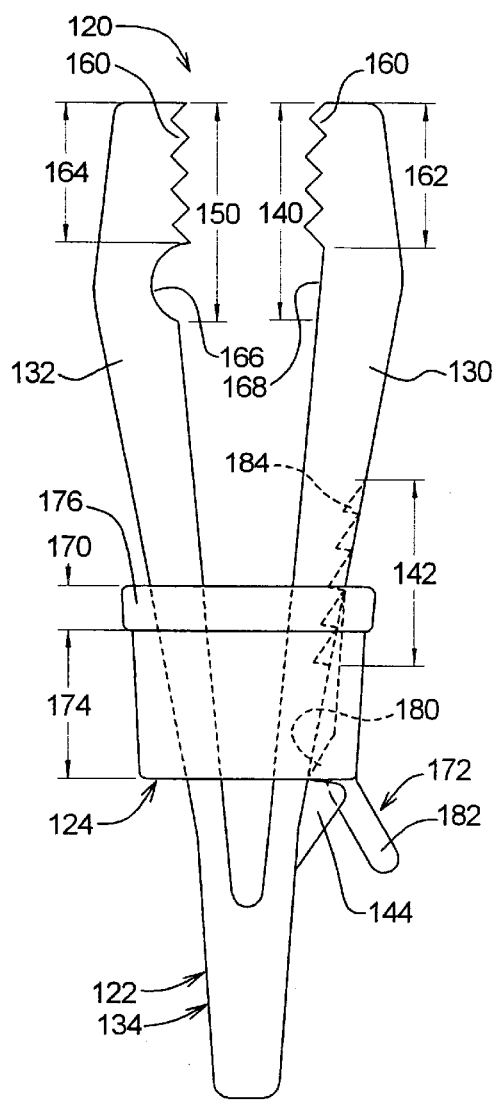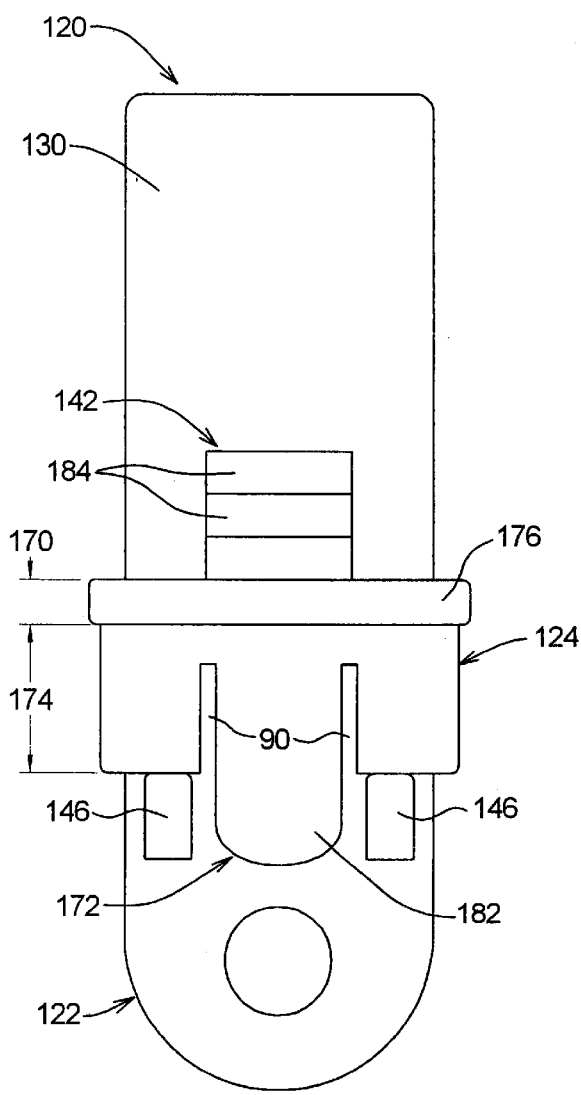

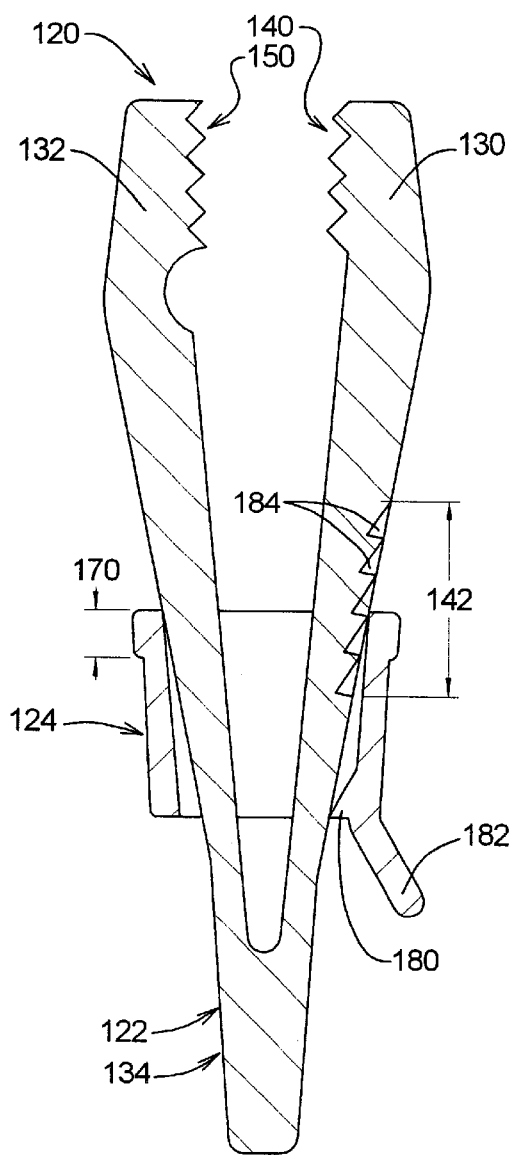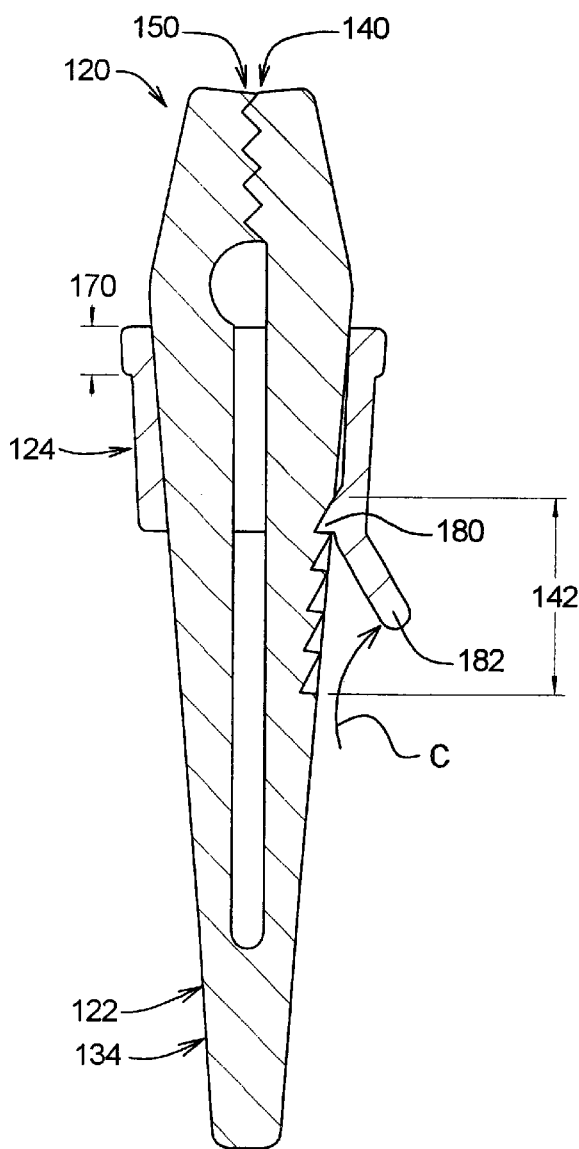

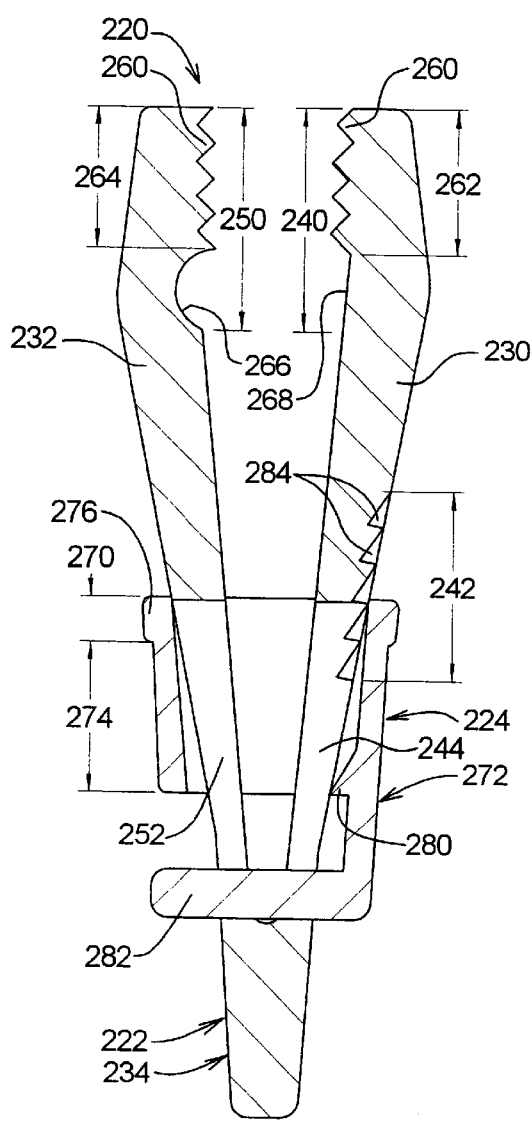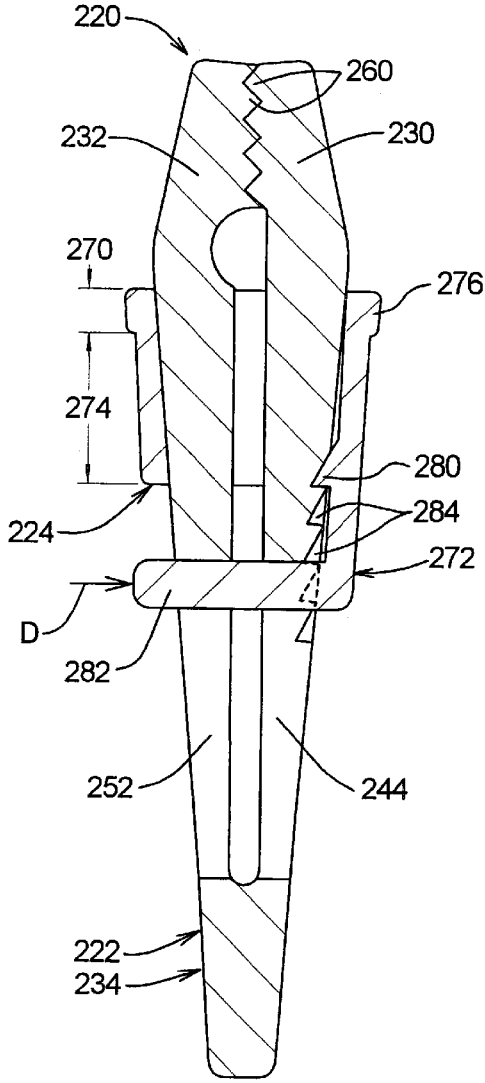

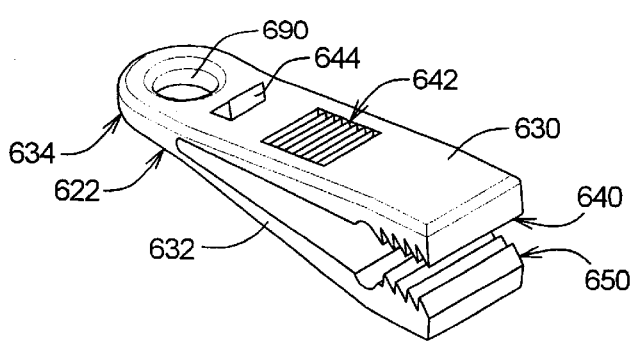
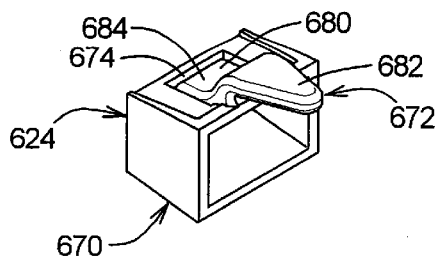
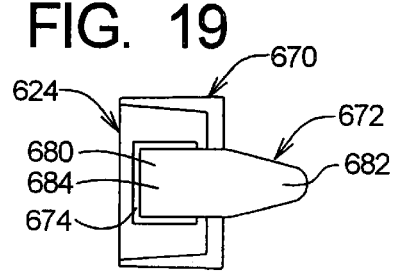
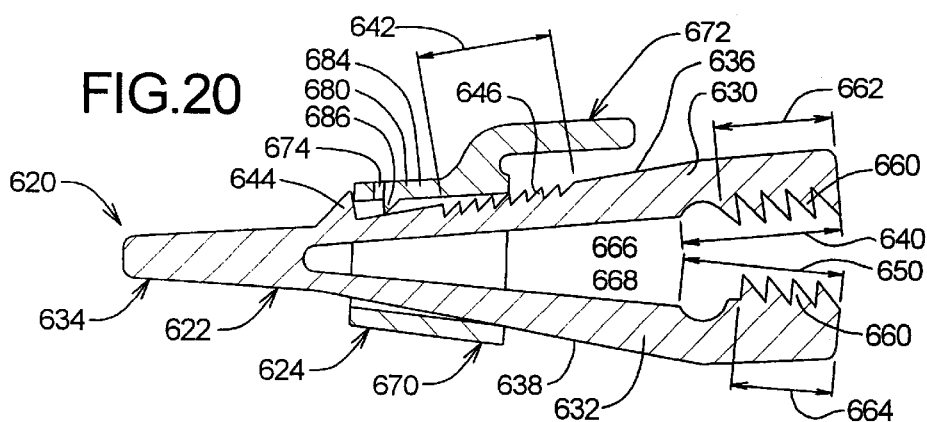
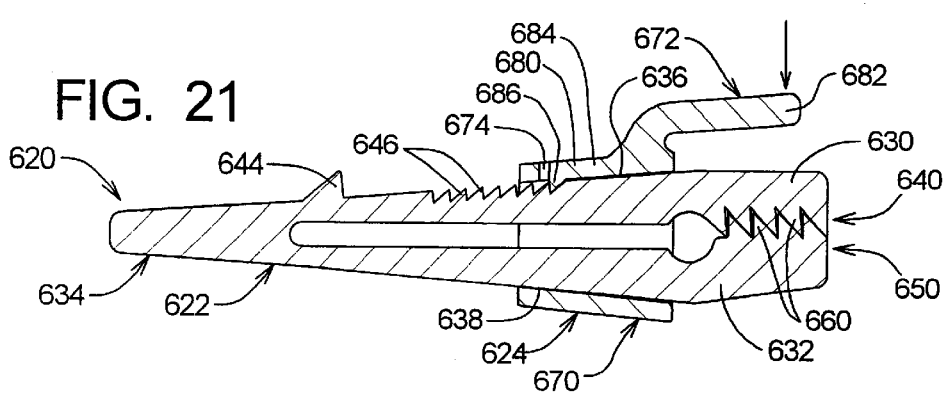

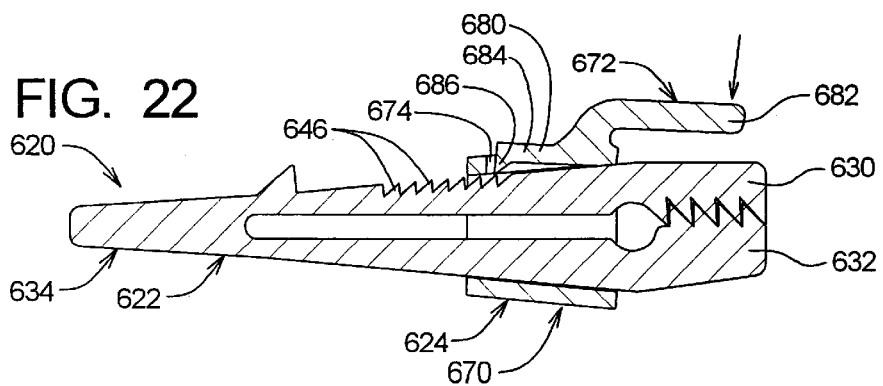
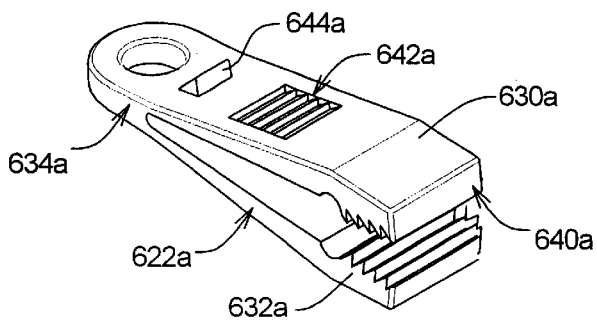
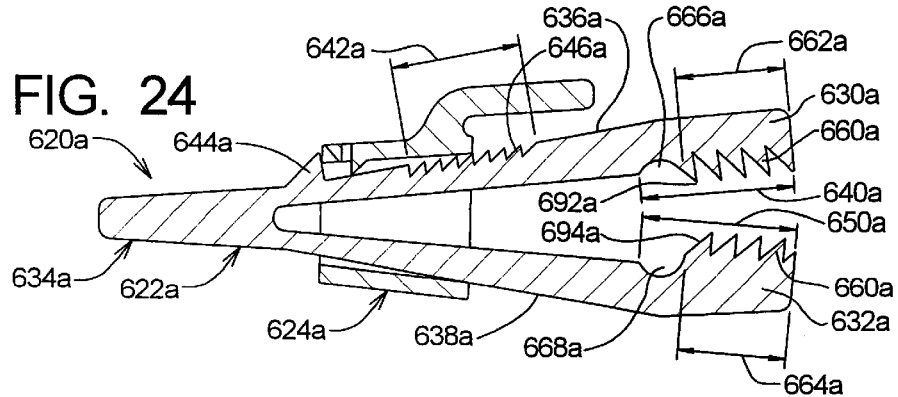
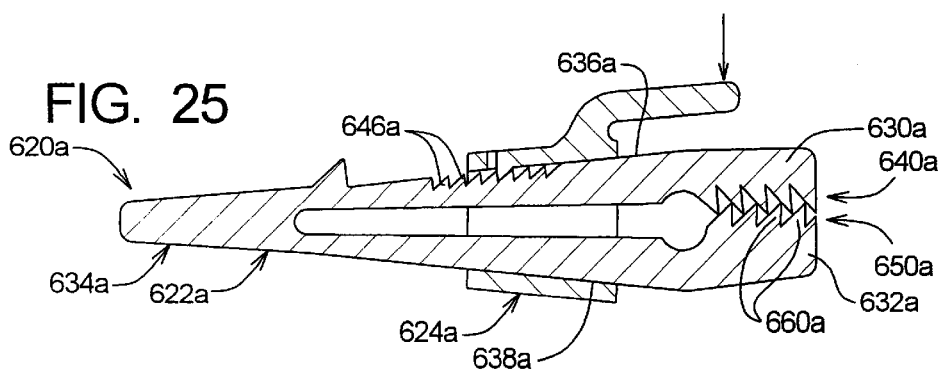

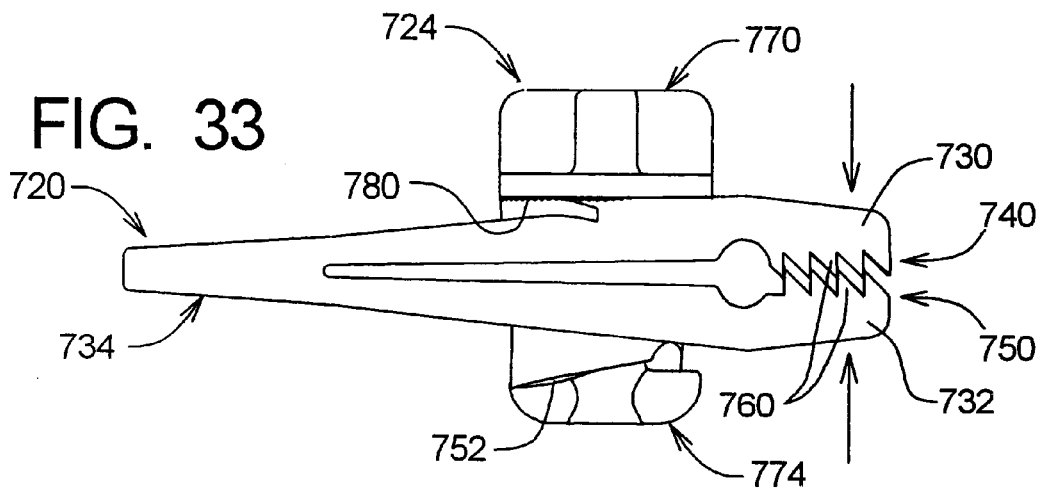
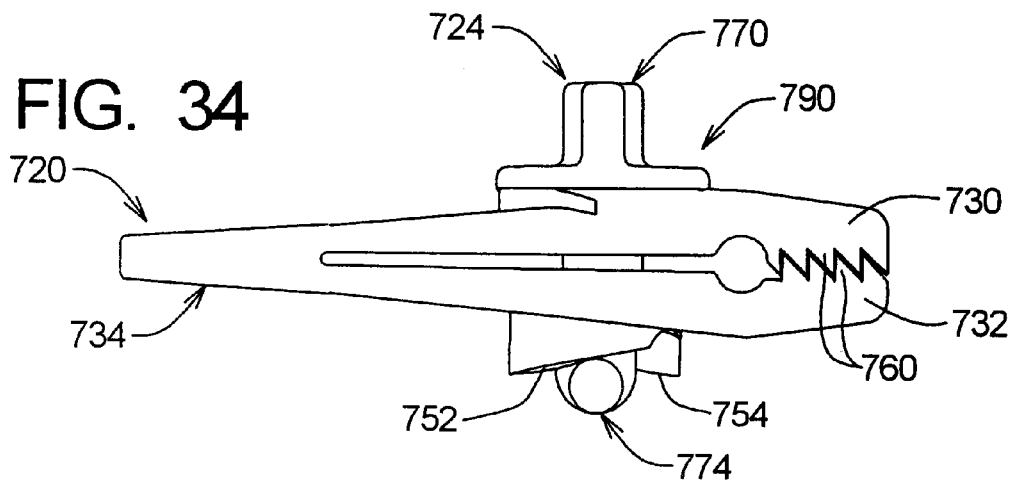

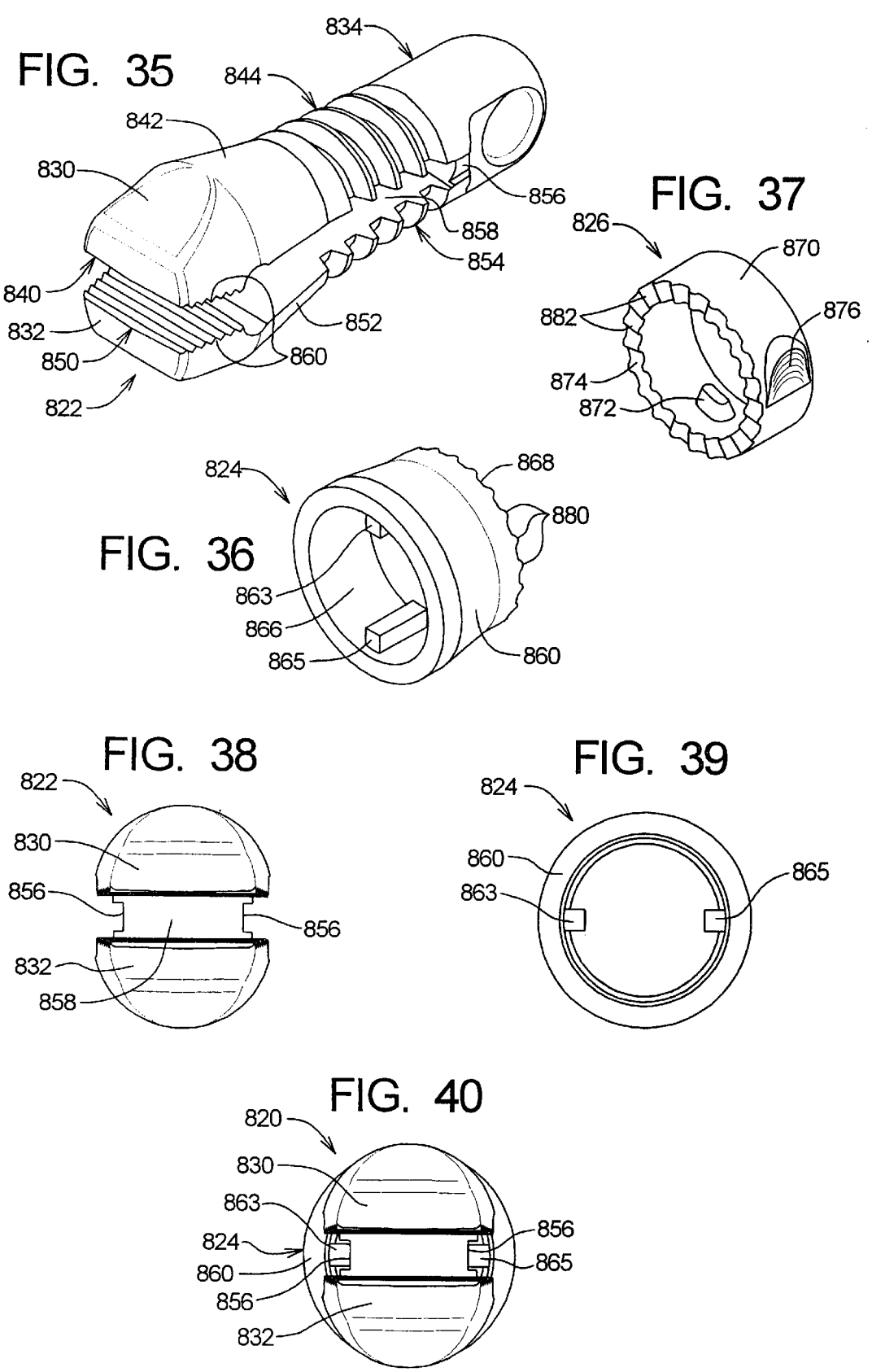

CLIP SYSTEMS AND METHODS FOR SHEET MATERIALS

RELATED APPLICATIONS

This application claims priority of U.S. Provisional Patent Application Ser. No. 60/358,455 filed on Feb. 19, 2002, and U.S. Provisional Patent Application Ser. No. 60/423,111 filed on Nov. 1, 2002.

TECHNICAL FIELD

The present invention relates to clip assemblies and, more specifically, to clip assemblies that are adapted to be attached to sheet material to allow the sheet material to be tied down.

BACKGROUND OF THE INVENTION

Sheet material is often used to protect items during storage and transportation. Protective sheet material is typically a relatively strong, waterproof, flexible member that reduces exposure of the protected item to the elements. Protective sheet material has traditionally been made of canvas or coated canvas, but plastic, vinyl, and combinations of canvas, plastic, and/or vinyl are now widely used as protective sheet material.

Whether the item to be protected is simply stored outside or is being transported on a vehicle, the protective sheet material is often exposed to wind and/or other air movement. Accordingly, the protective sheet material is often tied down over the item to be protected. Often, eyelets are sewn into the edge of the sheet material to allow a securing line to be attached to the sheet material. The securing line is then secured to a fixed point to prevent air movement from causing the sheet material to be blown away from the item to be protected.

The positions of the eyelets are predetermined and may or may not be appropriate for a given item to be protected and fixed points adjacent thereto. For example, a vehicle for transporting the item to be protected will typically have cleats or other fixed points to which a securing line can be attached. When the protective sheet material is arranged over the item to be protected, the cleats may not be appropriate placed relative to the eyelets for placement of a securing line.

In addition, the eyelets typically define openings in the sheet material. To ensure, that the sheet material remains waterproof, the eyelets are arranged only near the edges of the sheet material. When the sheet material is arranged over a particular item to be protected, the sheet material may need to be folded or otherwise arranged such that the securing line cannot be conveniently attached to an eyelet located on the edge of the sheet material.

Sheet material clips have been developed that, in essence, function as movable eyelets that allow a line to be attached at any point on a sheet of material. Sheet material clips typically comprise two fingers between which the sheet material is gripped. The fingers are connected at a base portion that defines a tie-down hole to which the securing line may be attached. In use, the edge of the sheet material may be placed between the fingers. Alternatively, a fold or other wrinkle may be formed in the sheet material that may be inserted between the fingers. In either case, the fingers are clamped together to grip the edge or fold in the sheet material at a location appropriate for a particular situation.

The present invention relates to improvements in sheet material clips that allow a securing line to be attached at any location to a sheet material.

SUMMARY OF THE INVENTION

The present invention may be embodied as a clip assembly for sheet materials comprising a clip member and a collar member. The clip member is made of resilient material such that the clip member may be deformed from a normally open configuration into a closed position. The clip member defines first and second finger portions that do not engage each other when the clip member is in the open configuration and engage each other when the clip member is in the closed position. The collar member defines at least one latch portion, a lever portion, and a housing interior. The collar member is made of resilient material such that applying a force to the lever portion causes the collar member to deform from a normally engaged configuration to a disengaged configuration.

The present invention may also be embodied as a clip for sheet materials comprising a clip member and a collar member. The clip member is made of resilient material such that the clip member may be deformed from a normally open configuration into a closed position. The first and second finger portions define first and second gripping portions, respectively. At least one of the first and second gripping portions defines a line notch adapted to receive an edge line of the sheet material. The collar member defining a housing interior. The clip member extends through the housing interior such that when the collar member is in a first position relative to the clip member, the clip member is in the open configuration. When the collar member is in a second position relative to the clip member, the collar member acts on the clip member to place the clip member in the closed configuration.

The present invention may also be embodied as a method of using the assemblies described above.

BRIEF DESCRIPTION OF THE DRAWINGS

FIG. 3 is a side elevation view of the clip assembly of FIG. 1 in a closed or clamping configuration;

FIG. 4 is a front elevation, partial cutaway view of the clip assembly of FIG. 1 in the clamping configuration shown in FIG. 3;

FIG. 6 is a side elevation view of a clip assembly of a second embodiment of the present invention;

FIG. 7 is a front elevation view of the clip assembly of FIG. 6;

FIG. 8 is a side cutaway view of the clip assembly of FIG. 6 in an unclamped configuration;

FIG. 9 is a side cutaway view of the clip assembly of FIG. 6 in a clamped configuration;

FIG. 10 is a side elevation cutaway view showing another embodiment of a third embodiment of a clip assembly constructed in accordance with the present invention;

FIG. 11 is a side cutaway view depicting the clip assembly of FIG. 10 in a clamped configuration;

FIG. 17 is a perspective view of a clip member of a clip assembly of a seventh embodiment of the present invention;

FIG. 18 is a perspective view of a collar member of the clip assembly of the seventh embodiment;

FIG. 19 is a top plan view of the collar member of FIG. 18;

FIG. 20 is a side elevation section view showing the clip assembly of seventh embodiment in a released position;

FIG. 21 is view similar to FIG. 20 showing the clip assembly of seventh embodiment in a clamped position;

FIG. 22 is a view similar to FIG. 21 showing a force applied to the clip assembly of FIG. 21 to allow the clip assembly to be moved from the clamped to the released position;

FIG. 23 is a perspective view of a clip member of a clip assembly of an eighth embodiment of the present invention;

FIG. 24 is a side elevation section view showing the clip assembly of eighth embodiment in a released position;

FIG. 25 is view similar to FIG. 24 showing the clip assembly of eighth embodiment in a clamped position;

FIG. 33 is side elevation view showing the clip assembly of tenth moving from the released position to a clamped position;

FIG. 34 is a view similar to FIG. 33 showing the clip assembly of FIG. 33 in the clamped position;

FIG. 35 is a perspective view of a clip member of a clip assembly of an eleventh embodiment of the present invention;

FIG. 36 is a perspective view of a compression ring of the clip assembly of the eleventh embodiment;

FIG. 37 is a perspective view of a retaining ring of the clip assembly of the eleventh embodiment;

FIG. 38 is an end elevation view of the clip member of FIG. 35;

FIG. 39 is an end elevation view of the compression ring of FIG. 36;

FIG. 40 is an end elevation view similar to FIGS. 39 and 40 showing the compression ring on the clip member;

DETAILED DESCRIPTION OF THE PREFERRED EMBODIMENTS

The present invention may be embodied in different forms, a number of these forms will be described below as separate embodiments of the invention.

First Embodiment

Referring initially to FIGS. 1–5, depicted therein as a first embodiment of a clip assembly 20 constructed in accordance with, and embodying, the principles of the present invention. The clip assembly 20 comprises a clip member 22 and a collar member 24.

Figure 1:
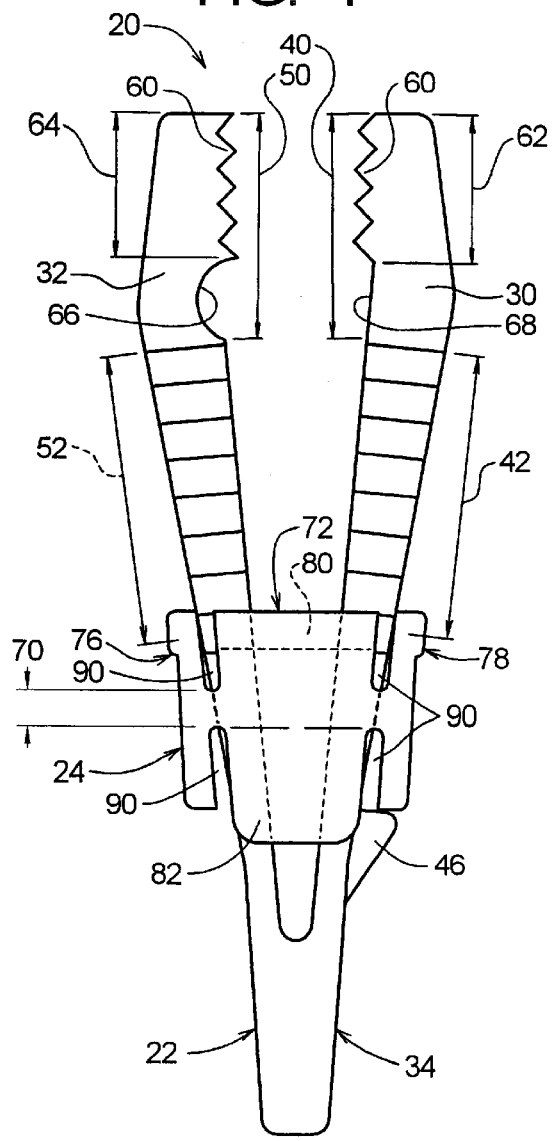
FIG. 1 is a side elevation view of a first embodiment of a clip assembly of the present invention.
Figure 2:
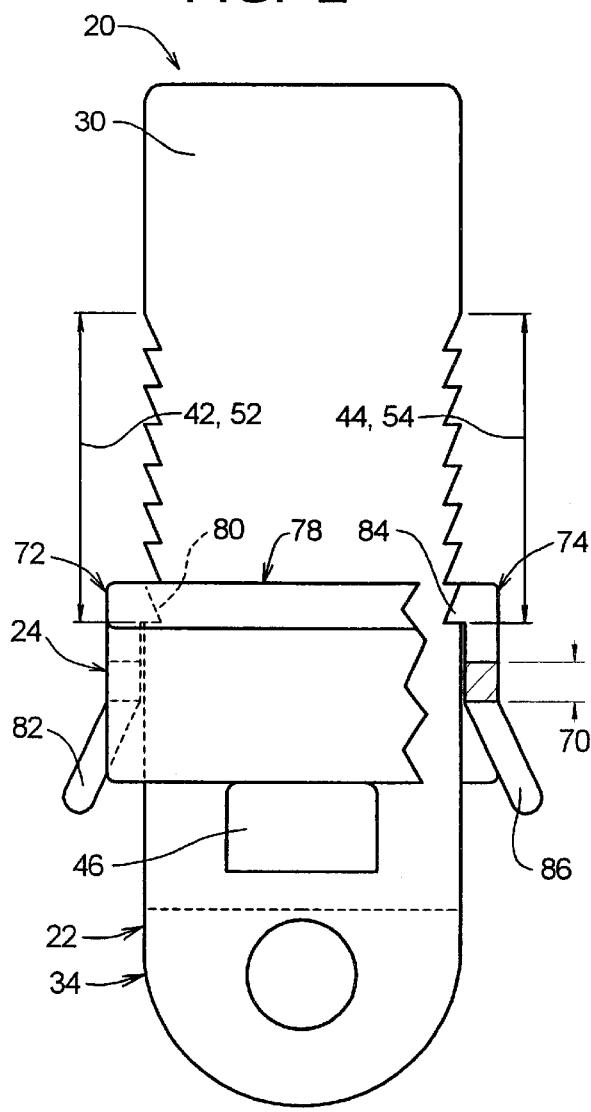
FIG. 2 is a front elevation, partial cutaway view of the clip assembly of FIG. 1.
Figure 4A:
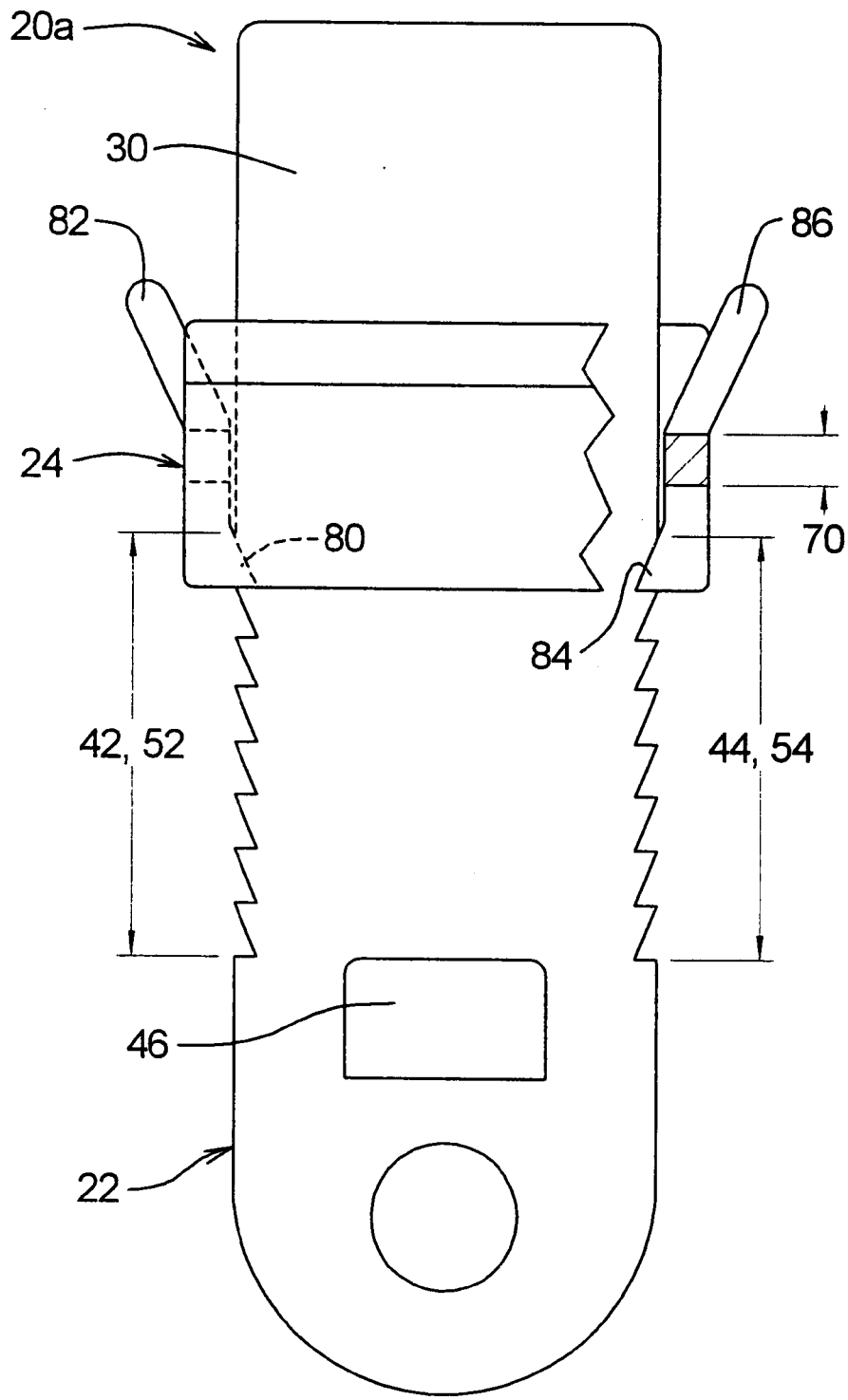
FIG. 4A is a front elevation, partial cutaway view similar to FIG. 4 showing a possible reversal of parts of the clip assembly of FIG. 1.

The clip member 22 defines first and second fingers 30 and 32 connected at a hinge portion 34. The clip member 22 is molded from a single piece of plastic such that the fingers 30 and 32 extend from the hinge portion 34. Without the application of external forces on the fingers 30 and 32, these fingers are spaced from each other in an open or unclamped configuration as shown in FIG. 1. However, the material from which the clip member 22 is made is sufficiently flexible to allow the finger members to be forced towards each other into a clamped configuration as shown in FIG. 3.

The collar member 24 slides between clamped and unclamped positions relative to the clip member 22. When the collar member 24 is in the unclamped position as shown in FIG. 1, the fingers 30 and 32 are in the open configuration. When the collar member 24 is in the clamped position as shown in FIG. 3, the fingers 30 and 32 are forced towards each other such that the clip member 22 is in its clamped configuration.

The first finger 30 defines a first gripping portion 40, first and second ratchet portions 42 and 44, and a retaining projection 46. The second finger 32 defines a second grouping portion 50 and third and fourth ratchet portions 52 and 54. Each of the grouping portions 40 and 50 comprise a plurality of gripping teeth 60. These teeth are arranged in a first set 62 on the first grouping portion 40 and a second set 64 on the second grouping portion 50. The teeth 60 in these sets 62 and 64 are offset such that they mesh together when the fingers 30 and 32 are in the closed configuration as shown in FIG. 3. These offsetting teeth improve the ability of the clip assembly 22 be secured onto a sheet of material.

Further, in the exemplary clip assembly 20, a line notch 66 is formed in the second gripping portion 50, and a line surface 68 is formed in the first gripping portion 40. Often, the sheet material is edged with a cord or line to strengthen the edge of the material. The line is a thin cord having a cross sectional area similar to the space between the line notch 66 and the line notch 68 when the fingers 30 and 32 are in the closed configuration. The line notch 66 thus provides a space to accommodate a line-edged sheet material without preventing the fingers 30 and 32 from being forced into the clamped configuration.

The collar member 24 comprises a belt portion 70 (FIG. 4A) that extends completely around the first and second fingers 30 and 32. The belt portion 70 establishes a closed loop the cross-sectional area of which is the substantially the same when the collar member 24 is in both the clamped and unclamped positions.

Thus, as the collar member 24 moves from the unclamped position to the clamped position, the collar member engages the outer surface of the fingers 30 and 32. These outer surfaces are slanted such that, as the collar member moves from the unclamped position to the clamped position, the gripping portions 40 and 50 of the fingers 30 and 32 are gradually forced together to place the clip member 22 in the clamped configuration.

The collar member 24 further comprises a first latch portion 72 and a second latch portion 74. These latch portions 72 and 74 are arranged on the sides of the clip member such that they oppose the first and second and third and fourth ratchet portions 42, 44, 52, 54, respectively. The exemplary collar member 24 further comprises first and second vice portions 76 and 78 that extend from the belt portion 70 along the outer surfaces of the fingers 30 and 32. When the clip member 22 is in the clamped configuration, the vice portions 76 and 78 extend over the gripping portions 40 and 52 to help hold the clip member 22 in its clamped configuration.

The first latch portion 72 further defines a first latch projection 80 and a first lever projection 82. The second latch portion 74 similarly defines a second latch projection 84 and a second lever projection 86. A plurality of relief slits 90 are formed in the collar member 24. As perhaps best shown in FIG. 2, the relief slits are formed such that the latch projections 80 and 84 may move relative to the belt portion 70 in opposition to the lever projections 82 and 86.

Figure 5:
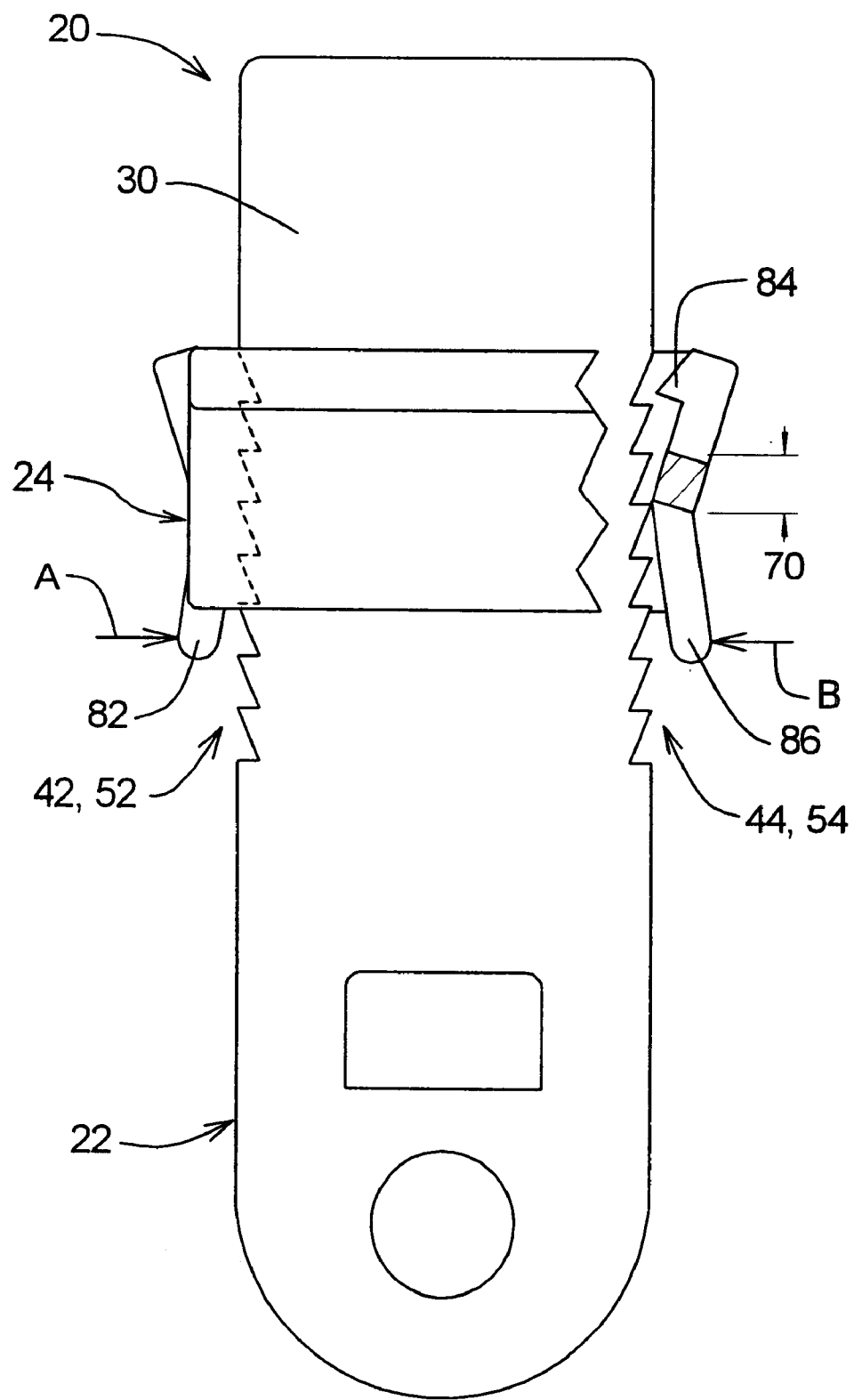
FIG. 5 is a front elevation, partial cutaway view showing a collar member of the clip assembly placed in an unlatched position.

The first and second latch projections 80 and 84 are sized and dimensioned to be received within notches defined by the first through fourth ratchet portions 42, 44, 52, 54. In particular, the latch projections 80 and 84 define surfaces that allow the collar member to be slid in only one direction relative to the clip member 22. To slide the collar member 24 in the other direction, the latch projections 80 and 84 must be displaced away from the ratchet portions 42, 44, 52, and 54. In the exemplary collar member 24, this is accomplished by pressing the lever projections 82 and 86 towards each other as shown by arrows A and B in FIG. 4. As shown in FIG. 5, pressing or pinching the lever projections 82 and 84 causes the latch projections 80 and 84 to pivot about the belt portion 70.

In use, the clip assembly 20 is arranged such that the collar member 24 is in the unclamped position and the clip member 22 is thus in the unclamped configuration. The sheet material to be gripped is then placed at least partly between the first and second gripping portions 40 and 50. The collar member is then slid from the unclamped position (FIGS. 1 and 2) into the clamped position (FIGS. 3–5). As the collar member moves from the unclamped to the clamped position, the latch projections 80 and 84 engage the ratchet portions 42, 44, 52, 54 to prevent the collar member from sliding back towards the unclamped position.

When the collar member 24 is fully in the clamped position, the belt portion 70 acts on the fingers 30 and 32 and forces these fingers 30 and 32 together. The engagement of the latch projections 80 and 84 and the ratchet portions 42, 44, 52, 54 prevents the collar member from moving out of the clamped position. The collar member 24 thus prevents the finger portions 30 and 32 from moving out of the clamped configuration. The clamp assembly 20 thus securely grasps the sheet material when in the clip member 22 is in the clamped configuration.

To release the clamp assembly 20 from the sheet material, the collar member 24 must be slid from the clamped to the unclamped position to allow the fingers 30 and 32 to move from the clamped to the unclamped configuration. To do this, the pinching force is applied as shown in arrows A and B in FIGS. 4 and 5 to the first and second lever projections 82 and 86. These forces cause the latch projections 80 and 84 to release from the ratchet portions 42, 44, 52, and 54. The collar member 24 is then slid to its unclamped position while maintaining the forces A and B on the lever projections 82 and 86.

II. Second Embodiment

Referring now to FIGS. 6–9, depicted therein is a clip assembly 120 constructed in accordance with a second embodiment of the present invention. The clip assembly 120 comprises a clip member 122 and a collar member 124.

The clip member comprises first and second fingers 130 and 132 and a hinge portion 134. A first gripping portion 140, a ratchet portion 142, and first and second retaining portions 144 and 146 are formed on the first finger 130. A second gripping portion 150 is formed on the second finger 132.

The clip assembly 120 operates in a manner generally similar to that of the clip assembly 20 described above. The collar member 124 slides between clamped and unclamped positions along the clip member 122. When the collar member 124 is in the unclamped position, the clip member 122 is in the unclamped configuration with a space between the gripping portions 140 and 150. When the collar member 124 is in the clamped position, the collar member acts on the fingers 130 and 132 to force the gripping portions 140 and 150 together.

The gripping portions 140 and 150 define gripping teeth 160 arranged in first and second sets 162 and 164. The second gripping portion defines a line notch 166 while the first gripping portion defines a line surface 168. The gripping teeth, line notch, and line surface all engage a sheet material or line connected to the sheet material to prevent relative movement between the clip assembly 120 when the clip member 122 is in the clamped configuration.

The clip assembly 120 differs from the clip assembly 20 described above in the manner in which the collar member 124 is held in its clamped configuration. In particular, the collar member 124 comprises a belt portion 170, a latch portion 172, and a spacing portion 174. A belt rib 176 is formed on the belt portion 170. The belt rib 176 reinforces the belt portion 170 of the collar member 124.

The latch portion 172 defines a latch projection 180 and a lever portion 182. The ratchet portion 142 is formed only on one of the fingers 130 and 132. In the exemplary clip assembly 120, the ratchet portion 142 is formed as a series of indentations 184. The indentations 184 define surfaces that allows the collar member 124 to move from the unclamped position to the clamped position. However, the surfaces defining the indentations 184 engage the latch projection 182 prevent movement of the collar member 124 from the clamped position to the clamped position when the collar member 124 is in an un-deformed state.

However, as shown in FIG. 7, relief slits 90 are formed in the collar member 124 on either side of the latch portion 172. The relief slits 90 allow a force to be applied as shown by arrow C in FIG. 9 to the lever portion 182 which disengages the latch projection 180 from the surfaces defined by the indentations 184.

Accordingly, when the operator desires to move the clip member 122 out of its clamped configuration, the operator simply applies an outward force on the lever portion 182 to disengage the latch projection 180 from the ratchet indentations 184; at this point, the collar member 124 may be slid from its clamped position down into its unclamped position. The retaining projections 144 and 146 engage the collar member 124 in its unclamped position to prevent the collar member 124 from sliding completely off the clip member 122.

The clip assembly 120 thus operates in a manner similar to the clip assembly described above. The collar member 124 is moved into the clamped position to force the clip member 122 into the clamped configuration. An outward force is applied to the lever portion 182 to allow the collar member to be slid back into its unclamped position. In addition, the belt portion 170 is closer to the gripping portions 140 and 150 when the collar member 124 is in the clamping position.

III. Third Embodiment

Referring now to FIGS. 10 and 11, depicted therein is a clip assembly 220 of a third embodiment to the present invention. The clip assembly 220 is similar to the clip assemblies 20 and 120 described above in that it comprises a clip member 222 and a collar member 224. The clip member 222 comprises first and second fingers 230 and 232 and a hinge portion 234. The first finger 230 defines a first gripping portion 240 and a ratchet portion 242; a first button slot 244 is also formed in the first finger 230. The second finger 232 comprises a second gripping portion 250 and a second button slot 252.

As with the clip members 22 and 122 described above, the gripping portions 240 and 250 define gripping teeth 260 arranged in first and second sets 262 and 264. Further, the gripping portions 240 and 250 define a line notch 266 and a line surface 268. The gripping portions 240 and 250 function in essentially the same manner as the gripping portions described and will not be described again in detail below.

The collar member 224 defines a belt portion 270, a latch portion 272, and a spacing portion 274. A belt rib 276 extends around and reinforces the belt portion 270. A latch projection 280 and button projection 282 are formed on the latch portion 272 of the collar member 224.

The clip assembly 220 operates in a manner generally similar to the collar member 124 described above. The latch projections 280 engage indentations 284 defining the ratchet portion 242 of the first finger 230. The primary difference is that button projection 282 extends through the first and second button slots 244 and 252 in the fingers 230 and 232. The button projection 282 extends completely to the other side of the clip member 222 from the latch projection 280.

Accordingly, to disengage the latch member 280 from the indentations 284, a force is applied as shown by arrow D in FIG. 11 on the button projection 282 towards, rather than away from, the clip member 222. The use of the button projection 282 extending through the button slots 244 and 252 simplifies the process of disengaging the latch projections 280 from the ratchet portion 242.

Although not shown in FIGS. 10 and 11, relief slits are formed in the collar member 224 similar to those formed in the collar member 124 described above.

IV. Fourth Embodiment

Figure 12:
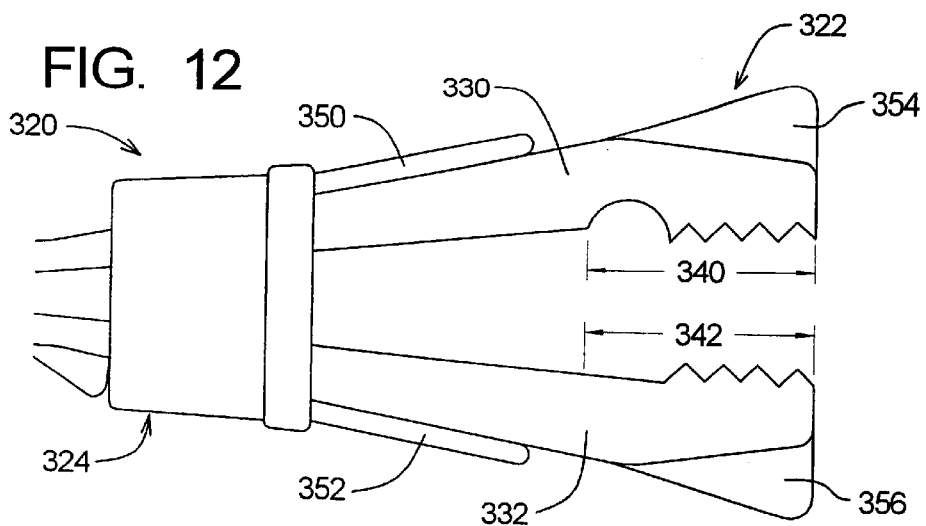
FIG. 12 is a partial side elevation view depicting yet another clip assembly of the present invention.
Figure 13:
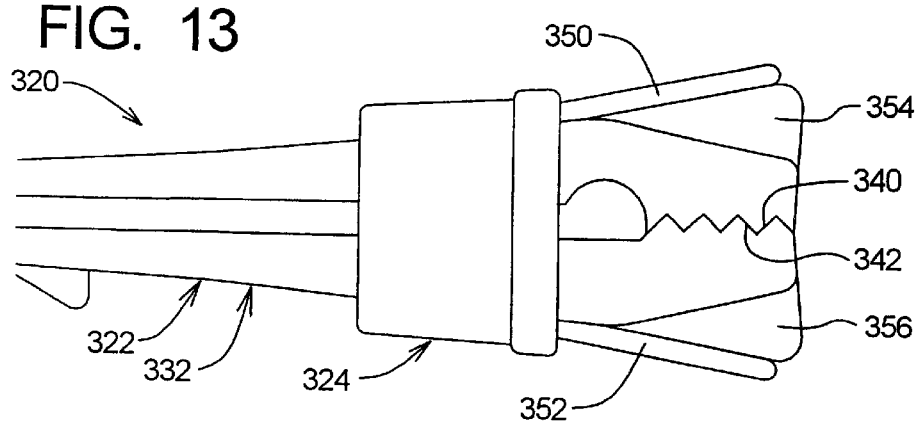
FIG. 13 is a side elevation view of the clip assembly of FIG. 12 shown in a clamped configuration.
Figure 14:
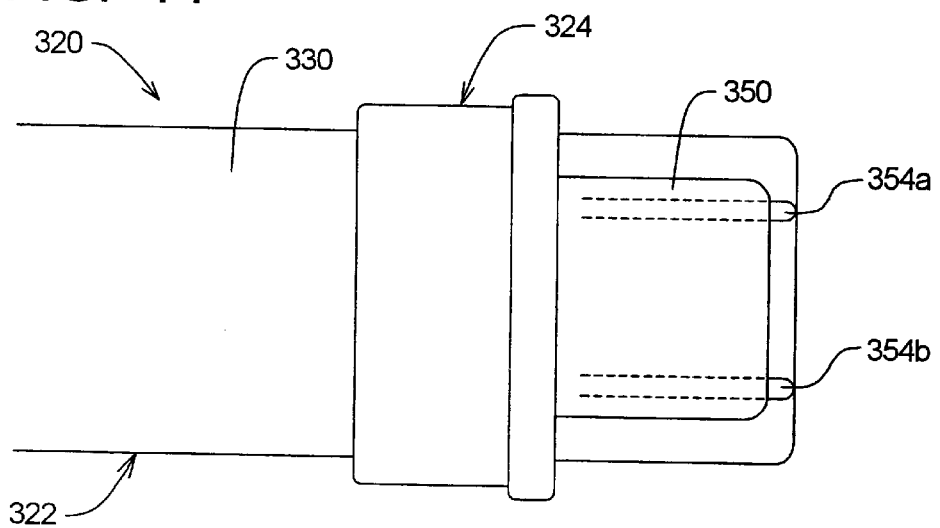
FIG. 14 is a partial top plan view of the clip assembly of FIG. 12 in the clamped configuration.

Referring now to FIGS. 12–14, depicted therein is yet another exemplary clip assembly 320 constructed in accordance with, and embodying, the principals of the present invention. The clip assembly 320 comprises a clip member 322 and collar member 324. The clip member 322 comprises fingers 330 and 332 and a hinge portion (not shown). The collar member 324 moves between clamped and unclamped positions along the clip member 322. The fingers 330 and 332 define gripping portion 340 and 342. When the collar member 324 is in its clamping position (FIG. 13), the gripping portions 340 and 342 are forced towards each other to grip a sheet material or the like. In addition, a releasable latch system (not shown) is provided to maintain the collar member in its clamped position.

Extending from the collar member 324 are reinforcing arms 350 and 352. In addition, extending from the fingers 330 and 332 are reinforcing flanges 354 and 356. The reinforcing arms 350 and 352 essentially extend the clamping force applied by the collar member 324 out over the clamping portions 340 and 342. The interaction of the reinforcing projections 350, 352 and reinforcing flanges 354, 356 applies additional pressure to hold the gripping portions 340 and 342 together and thereby more securely fasten the clip assembly 320 to the sheet member to which it is attached.

The reinforcing system formed by the reinforcing projections 350, 352 and reinforcing flanges 354, 356 can be applied to any one of the clip assemblies 20, 120, or 220 described above. In addition, this reinforcing system may also be applied to any other clip assembly, including clip assemblies known in the prior art.

V. Fifth Embodiment

Figure 15:
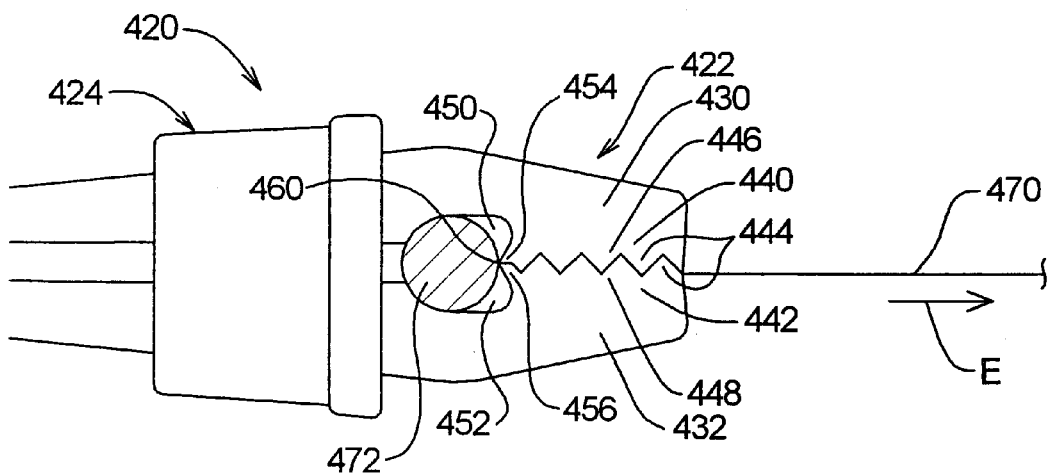
FIG. 15 is a side elevation view of a fifth embodiment of a clamp assembly of the present invention.

Referring now to FIG. 15, depicted therein is a clip assembly 20 of yet another embodiment of the present invention. The clip assembly 420 comprises a clip member 422 and a collar member 424. The basic operation of the clip member 422 and collar member 424 is the same as that of any of the other embodiments described above or below and will not be described herein in further detail.

As with the other embodiments, the clip member 422 defines first and second fingers 430 and 432. The collar member 424 forces the fingers 430 and 432 together. The fingers 430 and 432 define gripping portions 440 and 442. The gripping portions 440 and 442 comprise gripping teeth 444 arranged in sets 446 and 448.

In addition, the gripping portions 440 and 442 both define line notches 450 and 452. The line notches 450 and 452 are at least partly defined by line teeth 454 and 456. The line teeth are substantially centrally aligned relative to the clip member 422 in its clamped configuration. In this clamped configuration, the line teeth 454 and 456 are forced together to form a line projection 460.

As shown in FIG. 15, the clip assembly 420 is attached to a sheet material 470 having a line 472 along its edge. The line is received within the line notches 450 and 452. In addition, the line projection 460 formed by the line teeth 454 and 456 extend approximately along a radial line extending from the axis of the line 472. Accordingly, when a force is applied as shown by arrow E on the sheet material 470, the line projection 460 presses into the line 472, and the line 472 will deform slightly such that it conforms to the projection 460.

The line 472 itself will thus assist in holding the line teeth 454 and 456 together, which will help the collar member 424 maintain the clip member 422 in its clamping configuration. As the force applied to the sheet material 470 increases, the line projection 460 will press further into line 472 and provide additional reinforcement to the clip member 422.

In clip members that do not use line teeth 454 and 456 forming the line projection 460, the edge line acts somewhat like a wedge that forces the fingers apart from each other. Under extreme loads, the fingers of a clip member can actually deform past the collar member such that the gripping portions move away from each other. In this case, the sheet material may slip from the clip assembly. The line teeth 454 and 456 reduce this tendency by reducing or eliminating the wedge effect created by the line notches and line surfaces of other gripping assemblies.

The anti-wedging effect created by the line projection 460 can be created by forming line notches 450 and 452 and line teeth 454 and 456 on any of the other embodiments of the present invention with similar effect.

VI. Sixth Embodiment

Figure 16:
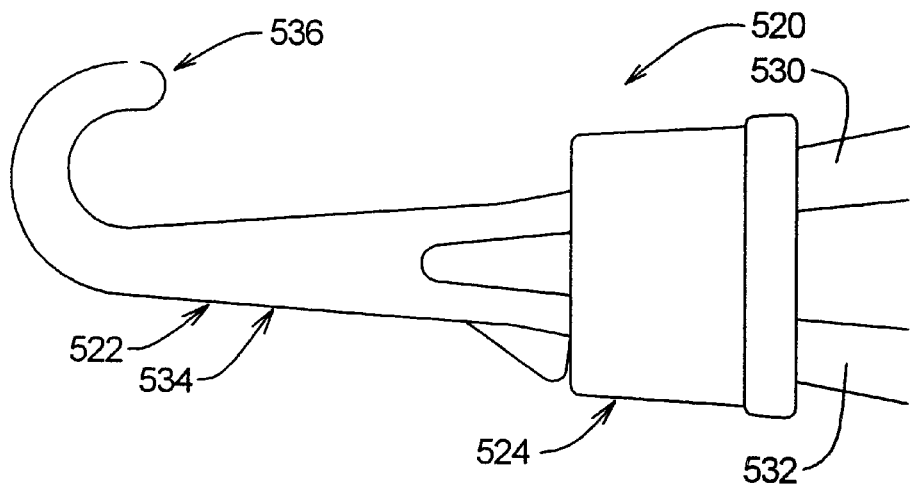
FIG. 16 is a side elevation view of a sixth embodiment of the present invention.

Referring now to FIG. 16, depicted at 520 therein is yet another exemplary clip assembly of the present invention. The clip assembly 520 comprises a clip member 522 and a collar member 524. As with the other embodiments, the clip member 522 comprises fingers 530 and 532. The collar moves relative to the clip member to force the fingers 530 and 532 into a clamping configuration.

The clip member 522 further comprises a hinge portion 534 and a hook portion 536 extending from the hinge portion 534 in a direction opposite the fingers 530 and 532. The hook portion 536 allows a rope or line to be attached to the clip member 522 without having to pass the line or rope through a hole in the hinge portion 534 of the clip member 522. Again, the hook portion 536 may be applied to any one of the embodiments of the present invention described herein as well as to certain clip assemblies of the prior art. In addition, the hook portion 536 may be combined with a conventional hole formed in the hinge portion 534.

VII. Seventh, Eighth, and Ninth Embodiments

Referring now to FIGS. 17–27, indicated therein by reference characters 620, 620a, and 622b are seventh, eighth, and ninth embodiments of clip assemblies of the present invention. The clip assembly of the seventh embodiment is shown in FIGS. 17–22. The clip assembly of the eighth embodiment is shown in FIGS. 23–25 and is identified by reference characters similar to those of the seventh embodiment but with the suffix "a". Similarly, a clip member of the clip assembly of the ninth embodiment is in FIGS. 26 and 27 and is also identified by similar reference characters having the suffix "b".

In many respects, the seventh, eighth, and ninth embodiments of the present are constructed and operate in a similar manner. The clip assembly 620 of the seventh embodiment will thus be described in detail below, and the clip assembly 620a of the eighth embodiment and clip member 622b of the ninth embodiment will be described only to the extent that they differ from the clip assembly 620.

The clip assembly 620 comprises a clip member 622 and a collar member 624. The clip member 622 comprises first and second fingers 630 and 632 and a hinge portion 634. First and second cam surfaces 636 and 638 are formed on the first and second fingers 630 and 632, respectively.

The first finger 630 defines a first gripping portion 640, a ratchet portion 642, and a stop projection 644. The ratchet portion 642 defines ratchet teeth 646. The second finger 632 comprises a second gripping portion 650. The gripping portions 640 and 650 define gripping teeth 660 arranged in first and second sets 662 and 664. Further, the gripping portions 640 and 650 define a first line notch 666 and a second line notch 668, respectively.

The gripping portions 640 and 650 function in a manner that is similar to that of the gripping portions described above. The gripping teeth 660 in the respective sets 662 and 664 are offset in a complementary manner such that, when the first and second fingers 630 and 632 engage each other as shown in FIGS. 21 and 22, the teeth 660 mesh in gear-like fashion. A sheet of flexible material (not shown) gripped between the gripping portions 640 and 650 is thus forced into a zigzag pattern that increases the area of the sheet material engaged by the gripping portions 640 and 650. The line notches 666 and 668 accommodate lines that are sewn along the edges of certain types of sheet material that are commonly available in the marketplace.

The collar member 624 defines a housing portion 670, a latch portion 672, and a latch opening 674. A latch projection 680 and latch lever 682 are formed on the latch portion 672. The latch projection 680 comprises a spacing portion 684 that lies substantially within the plane of the latch opening 674 and an engaging portion 686 that normally extends into the interior of the housing portion 670 through the latch opening 674. The latch lever 682 extends from the latch projection 680.

The collar member 624 is made of a relatively resilient material that deflects under certain circumstances. In particular, as shown by a comparison of FIGS. 21 and 22, the latch lever 682 is arranged such that applying a downward force thereto as shown at 688 causes the latch portion 672 to move such that the engaging portion 686 thereof is withdrawn from the interior of the housing portion 670 through the latch opening 674.

In use, the hinge portion 634 of clip member 622 is inserted through the collar member 624 in a first direction until the housing portion 670 engages the cam surfaces 636 and 638 as shown in FIG. 20. In addition, FIG. 20 shows that the clip member 622 is arranged such that the ratchet portion 642 thereof is exposed to the engaging portion 686 of the latch portion 672. The housing portion 670 deforms slightly to allow the collar member 624 to pass over the stop projection 644; the stop projection 644 maintains collar member 624 on the clip member 622 under most conditions. FIG. 20 shows the clip assembly 620 in a released configuration in which the gripping portions 640 and 650 are apart.

As generally discussed above, the clip member 622 is also made of a resilient material. Accordingly, with continued movement of the clip member 622 and the collar member 624 in the first direction (from FIG. 20 to FIG. 21), the housing portion 670 acts on the cam surfaces 636 and 638 to force the first and second fingers 630 and 632 together. The clip assembly 620 is thus placed in a clamped configuration by sliding the collar member 624 to force the gripping portions 640 and 650 together.

The engaging projection 686 engages the teeth 646 of the ratchet portion 642 as the collar member 624 moves in the first direction. This engagement locks the collar member 624 at successive locking positions along the length of the clip member 622 to prevent the resiliency of the clip member 622 from forcing the collar member 624 in a second direction opposite the first direction. The resiliency of the collar member 624 and the shapes of the engaging projection 686 and ratchet teeth 646 allow the latch portion 672 to move slightly out of the interior of the housing portion 670 between each locking position as the clip member 622 moves in the first direction.

The clip assembly 620 is placed from the clamped configuration into the released configuration (FIG. 22) by depressing the latch lever 682 as described above. Depressing the latch lever 682 causes the engaging portion 686 to be withdrawn from the interior of the housing portion 670 through the latch opening 674 as described above. At this point, the engaging portion 686 no longer engages the ratchet teeth 646, and the collar member 624 may freely be moved in either direction along the clip member 622.

The clip assembly 620, and in particular the clip member 622, may be configured for different intended environments and uses. For example, in a marine environment, the clip assembly 620 may be made of materials such as plastic that will not corrode. In an environment that is subjected to high heat, the clip assembly 620 may be made of metal. The clip member 622 may be adapted to define a hole 690 as shown in FIG. 17 and/or a hook as shown at 536 in FIG. 16 above. The gripping portions 640 and 650 of the clip member 622 can be modified, for example, as described in FIG. 12 or 13 above.

Referring now to FIGS. 23–25 and 26 and 27, the eighth and ninth embodiments depict still other modifications to the clip member 622 described above.

FIGS. 23–25 illustrate that the clip assembly 620a of the eighth embodiment comprises a clip member 622a and a collar member 624a. The clip member 622a comprises first and second fingers 630a and 632a and a hinge portion 634a; first and second cam surfaces 636a and 638a are formed on the first and second fingers 630a and 632a, respectively.

The first finger 630a defines a first gripping portion 640a, a ratchet portion 642a, and a stop projection 644a. The ratchet portion 642a defines ratchet teeth 646a. The second finger 632a comprises a second gripping portion 650a. The gripping portions 640a and 650a define gripping teeth 660a arranged in first and second sets 662a and 664a. Further, the gripping portions 640a and 650a define a first line notch 666a and a second line notch 668a, respectively.

The gripping teeth 660a differ from those described above. In particular, the teeth 660a in the opposing sets 662a and 664a do not mesh with each other. To the contrary, points 692a of the teeth 660a in the first set 662a engage slanted surfaces 694a of the teeth 660a in the second set 664a, and vice versa. For certain sheet materials, this configuration of teeth 660a can increase the gripping power of the clip assembly 620a.

Aside from the different configuration of the teeth 660a, the clip assembly 620a is assembled and operates in the same basic manner as the clip assembly 620. The assembly and operation of the clip assembly 620a will thus not be described in further detail herein.

Figure 26:
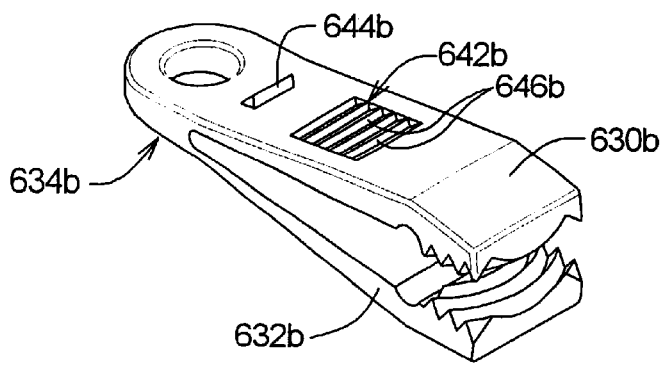
FIG. 26 is a perspective view of a clip member of a clip assembly of a ninth embodiment of the present invention.
Figure 27:
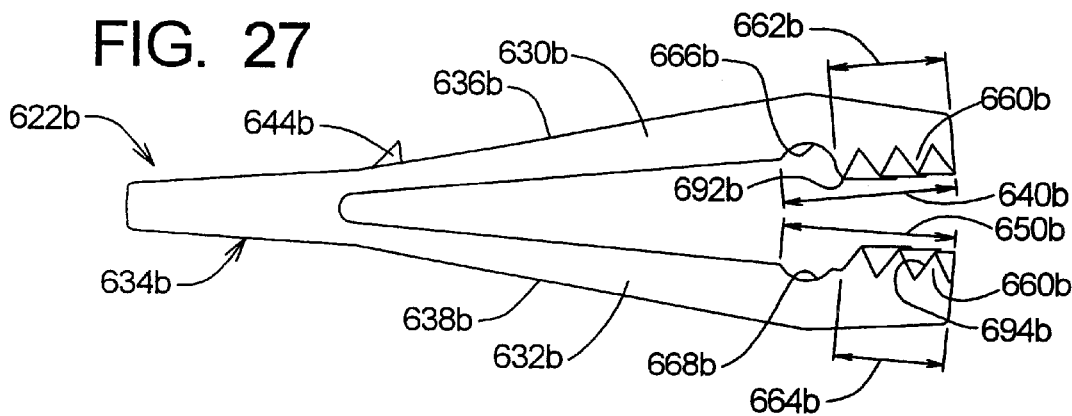
FIG. 27 is a side elevation section view showing the clip member of ninth embodiment in a released position.
Figure 28:
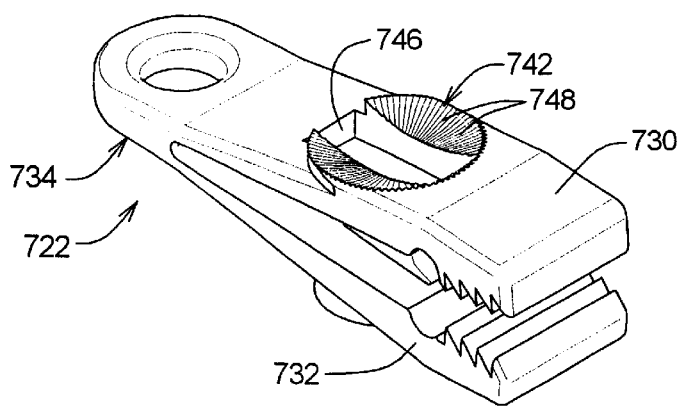
FIG. 28 is a perspective view of a clip member of a clip assembly of a tenth embodiment of the present invention.
Figure 29:
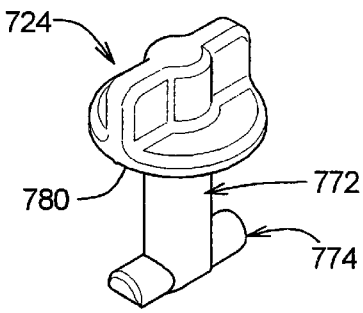
FIG. 29 is a perspective view of a cam pin of the clip assembly of the tenth embodiment.
Figure 30:
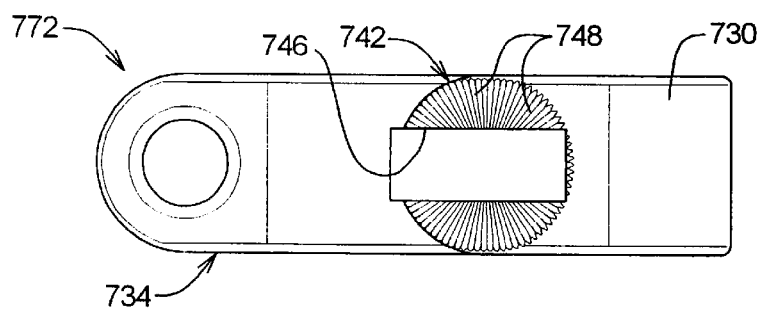
FIG. 30 is a top plan view of the clip member of FIG. 28.
Figure 31:
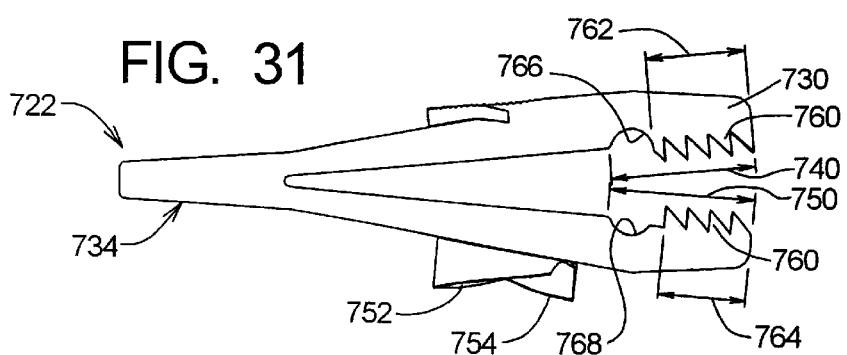
FIG. 31 is a side elevation section view showing the clip member of the tenth embodiment in a released position.
Figure 32:
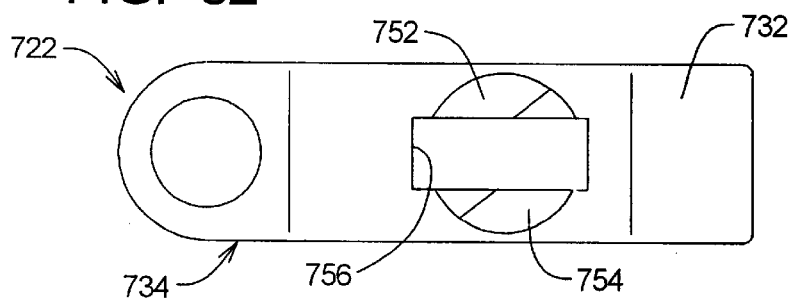
FIG. 32 is a bottom plan view of the clip member of FIG. 28.

Referring now more specifically to FIGS. 26 and 27, these figures depict a clip member 622b of the clip assembly of the ninth embodiment. The clip member 622b is intended to be used with a collar member similar to the collar members 624 and 624a described above.

The clip member 622b comprises first and second fingers 630b and 632b and a hinge portion 634b; first and second cam surfaces 636b and 638b are formed on the first and second fingers 630b and 632b, respectively. The first finger 630b defines a first gripping portion 640b, a ratchet portion 642b, and a stop projection 644b. The ratchet portion 642b defines ratchet teeth 646b. The second finger 632b comprises a second gripping portion 650b. The gripping portions 640b and 650b define gripping teeth 660b arranged in first and second sets 662b and 664b. Further, the gripping portions 640b and 650b define a first line notch 666b and a second line notch 668b, respectively.

The gripping teeth 660b differ from the teeth 660 and 660a described above. In particular, the teeth 660b are curved as perhaps best shown in FIG. 26. The curved teeth 660b are designed to resist pull out of the sheet material gripped thereby when loads are applied through a range of angles and not directly along the first and second directions described above. The exemplary teeth 660b in the opposing sets 662b and 664b mesh with each other, but the points 692b of the teeth 660b in the first set 662b may be offset to engage slanted surfaces 694b of the teeth 660b in the second set 664b, and vice versa. For certain loads, this configuration of teeth 660b can increase the gripping power of the clip assembly 620b.

Aside from the different configuration of the teeth 660b, the clip assembly 620b is assembled and operates in the same basic manner as the clip assembly 620. The assembly and operation of the clip assembly 620b will thus not be described in further detail herein.

VIII. Tenth Embodiment

Referring now to FIGS. 28–34, indicated therein by reference character 720 therein is a tenth embodiment of a clip assembly of the present invention. The clip assembly 720 comprises a clip member 722 and a cam pin 724. The clip member 722 comprises first and second fingers 730 and 732 and a hinge portion 734.

The first finger 730 comprises a first gripping portion 740, a ratchet portion 742, and a first pin hole 746. The ratchet portion 742 defines ratchet teeth 748. The second finger 732 comprises a second gripping portion 750, first and second cam surfaces 752 and 754, and a second pin hole 756.

The gripping portions 740 and 750 define gripping teeth 760 arranged in first and second sets 762 and 764. Further, the gripping portions 740 and 750 define a first line notch 766 and a second line notch 768, respectively. The gripping portions 740 and 750 function in a manner that is similar to that of any one of the gripping portions described above.

The cam pin 724 comprises a handle portion 770, a shaft portion 772, and a cam bar 774. A set of latch teeth 780 is formed on the handle portion 770. The cam bar 774 is sized and dimensioned to pass through the first and second pin holes 746 and 756 into a pre-engagement position when the cam pin 724 is in an insertion orientation relative to the clip member 722. The shaft portion 772 is sized and dimensioned such that, when the cam pin 724 is in the pre-engagement position, rotation of the cam pin 724 about the longitudinal axis of the shaft portion 772 causes the cam pin 724 to move into an engagement range. In the engagement range, the cam bar 774 engages the cam surfaces 752 and 754 and the latch teeth 780 engage the ratchet teeth 748.

More specifically, grasping and turning the handle portion 770 causes the cam pin 724 to rotate about the longitudinal axis of the shaft portion 772. This rotation of the cam pin 724 causes the cam bar 774 to rotate in a cam plane that is substantially perpendicular to shaft axis. With the cam pin 724 in the engagement range, the cam surfaces 752 and 754 are slanted with respect to the cam plane. The cam bar 774 engages the cam surfaces 752 and 754 as it rotates. Because the distance between the cam bar 774 and handle portion 770 is fixed, the cam bar 774 acts on fingers 730 and 732 through the cam surfaces 752 and 754 to force the fingers 730 and 732 together (FIG. 33). The fingers thus move between released (FIG. 31) and clamped (FIG. 34) configurations as the cam pin 724 rotates to close to 180° from the pre-engagement orientation.

To hold the cam pin 724 in a desired angular orientation with the engagement range, the latch teeth 780 engage the ratchet teeth 748. More specifically, the latch and ratchet teeth 780 and 748 are formed by slanted surfaces that radially extend from the longitudinal axis of the shaft portion 772. In any one of a plurality of locked positions, resiliency of the clip member causes the latch teeth 780 to mesh in a gear-like fashion with the ratchet teeth 748 to prevent relative angular movement between the cam pin 724 and the clip member 722. However, the resiliency of the clip member 722 allows the latch teeth 780 disengage from and ride over the ratchet teeth 748 from locked position to locked position as the cam pin 724 is rotated through the engagement range.

During use, the handle portion 770 is turned until the clip assembly 720 is in a clamped position on a sheet of material, and the latch teeth 780, ratchet teeth 748, and resiliency of clip member 722 form a locking system 790 that holds the clip assembly 720 in the clamped position.

Aside from the locking system 790 for holding the clip member 722 in the clamped position, the clip assembly 720 operates in the same basic manner as the clip assemblies described above. The operation of the clip assembly 720 will thus not be described in further detail herein.

IX. Eleventh Embodiment

Referring now to FIGS. 35–42, indicated therein by reference character 820 therein is an eleventh embodiment of a clip assembly of the present invention. The clip assembly 820 comprises a clip member 822, a compression ring 824, and a retaining ring 826. The clip member 822 comprises first and second fingers 830 and 832 and a hinge portion 834.

The first finger 830 comprises a first gripping portion 840, a first cam surface 842, and a first threaded surface 844. The second finger 832 comprises a second gripping portion 850, a second cam surface 852, and a second threaded surface 854. An alignment notch 856 is formed on each side of the hinge portion 834, and a finger gap 858 is formed between the fingers 830 and 832.

The gripping portions 840 and 850 define gripping teeth 860 arranged in first and second sets 862 and 864. Further, the gripping portions 840 and 850 define a first line notch 866 and a second line notch 868, respectively. The gripping portions 840 and 850 function in a manner that is similar to that of any one of the gripping portions described above.

The compression ring 824 comprises a housing portion 860, first and second alignment blocks 863 and 865, a compression surface 866, and a first ratchet surface 868. The retaining ring 826 comprises a barrel portion 870, one or more threading projections 872, a second ratchet surface 874, and one or more finger holds 876.

Figure 41:
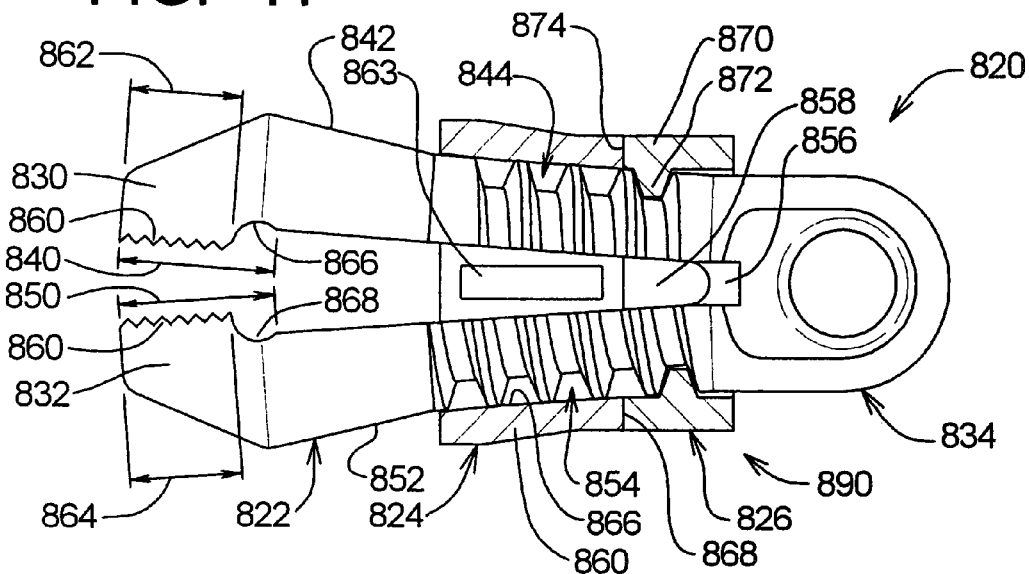
FIG. 41 is a side elevation section view showing the clip assembly of the eleventh embodiment in a released position.
Figure 42:
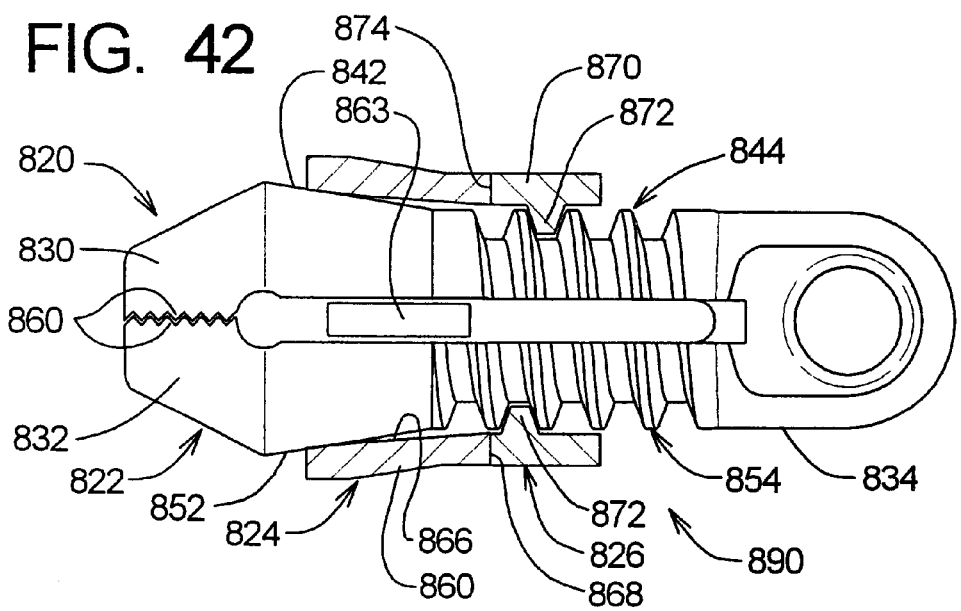
FIG. 42 is a side elevation section view showing the clip assembly of the eleventh embodiment in a clamped position.

The clip assembly 820 is assembled and operated as follows. First, the hinge portion 834 is inserted through the compression ring 824 such that the compression surface 866 engages the cam surfaces 842 and 852. The alignment blocks 863 and 865 pass through the alignment notches 856; during use as shown in FIGS. 41 and 42, the alignment blocks 863 and 865 lie within the finger gap 858. The alignment blocks 863 and 865 thus engage the fingers 830 and 832 to prevent relative rotation between the compression ring 824 and the clip member 822. The compression ring 824 thus slides without rotating along the clip member between a first position as shown in FIG. 41 and a second position as shown in FIG. 42.

The hinge portion 834 of the clip member 822 is then inserted into the retaining ring 826 such that the threading projections 872 engage the first and/or second threaded portions 844 and 854 of the fingers 830 and 832. The retaining ring 826 may be deformed slightly to allow the thickest part of the hinge portion 834 to pass by the threading projections 872.

With the threading projections 872 engaging the threaded portions 844 and 854, rotation of the retaining ring 826 relative to the clip member 822 causes the retaining ring 826 to move along the clip member 822 between first (FIG. 41) and second (FIG. 42) positions.

As the retaining ring 826 moves along the clip member 22 from the first to the second position, the retaining ring 826 forces the compression ring 824 from its first position to its second position. The compression surface 866 of the compression ring 824 acts on the cam surfaces 842 and 852 to force the fingers 830 and 832 from a released position (FIG. 41) to a clamped position (FIG. 42).

In the exemplary system 820, the second ratchet surface 874 on the retaining ring 826 engages first ratchet surface 868 on the compression ring 824. The engagement between the ratchet surfaces 868 and 874 transfers lateral movement of the retaining ring 826 to the compression ring 824.

However, while the retaining ring 826 rotates, the alignment blocks 862 and 864 prevent rotation of the compression ring 824. The first ratchet surface 868 thus does not rotate. Latch teeth 880 are defined by curved projections extending from the first ratchet surface 868. Locking teeth 882 are defined by similar curved projections extending from the second ratchet surface 874. These curved projections are sized and dimensioned such that the locking teeth 882 move up and over the latch teeth 880.

The resilience of the fingers 830 and 832 allows the latch teeth 880 to move slightly away from the locking teeth 882 to facilitate movement of the locking teeth 882 over the latch teeth 880 until the gripping portions 840 and 850 come into contact with each other. The latch teeth 880 engage the locking teeth 882 to inhibit rotation of the retaining ring 826 and thus maintain the clip system 820 in one of a plurality of predetermined positions between the clamped and released position. The resilience of the fingers 830 and 832 and the ratchet surfaces 874 and 868 form a locking system 890 that helps to secure the clip member 822 in the clamped position.

With the clip assembly 820 assembled as described above, sheet material is placed between the gripping portions 840 and 850. The retaining ring 826 is then rotated in a first direction until the ratchet surfaces 874 and 868 come into contact with each other. Further rotation of the retaining ring 826 in the first direction causes the compression ring 824 to move in a plurality of discrete increments until the clip member 822 is moved from the released position to the clamped positions. When the clip member 822 is in the clamped position, the sheet material is securely held between the gripping portions 840 and 850. To place the clip member 822 back into the released position, the retaining ring 826 is rotated in a second direction opposite the first direction. The finger holds 876 help the user rotate the retaining ring 826.

X. Conclusion

From the foregoing, it should be apparent that the principles of the present invention may be embodied in clipping systems and methods other than those depicted herein. For example, the ratchet portions described above employ a series of indentations into which latch projections extend. One of ordinary skill in the art will recognize that the positions of the projections and indentations may be changed and yield similar effect.

Also, the preferred embodiments of the invention described herein employ gripping portions comprising sets of teeth and opposing line notches and line surfaces. Other arrangements of gripping portions may be employed depending on the type and shape of the sheet material to be gripped.

Accordingly, the scope of the present invention should not be limited to the specific embodiments described herein.

What is claimed is:

1. A clip for sheet materials comprising:

a clip member defining a hinge portion, first and second finger portions extending from the hinge portion, where
      the first and second finger portions define first and second button slots, respectively,
      the clip member is made of resilient material such that the clip member may be deformed from a normally open configuration into a closed position,
      the first and second finger portions do not engage each other when the clip member is in the open configuration and the first and second finger portions engage each other when the clip member is in the closed position, and
      the first and second finger portions define first and second gripping portions, respectively, and at least one of the first and second gripping portions defines a line notch adapted to receive an edge line of the sheet material; and
   a collar member defining a housing interior and comprising a button projection; whereby
      the clip member extends through the housing interior such that
         when the collar member is in a first position relative to the clip member, the clip member is in the open configuration;
         when the collar member is in a second position relative to the clip member, the collar member acts on the clip member to place the clip member in the closed configuration;
         when the clip member is passed through the collar member, the button projection extends through the first and second button slots; and
         applying a force to the button projection causes the collar member to move from the normally engaged configuration to the disengaged configuration.

2. A clip member as recited in claim 1, in which:

the collar member further comprises first and second reinforcing arms; and the first and second finger portions each define at least one reinforcing flange; whereby
      when the collar member is in the second position, the first and second reinforcing arms engage the reinforcing flanges on the firsthand second finger portions, respectively.

3. A clip member as recited in claim 1, in which the first and second gripping portions define at least one line tooth that defines at least a portion of a line projection adapted to engage the edge line of the sheet material.

4. A clip member as recited in claim 1, in which:

the first and second gripping portions define first and second line notches, respectively; and the first and second gripping portions define first and second line teeth, respectively; whereby
      the first and second line teeth define a line projection adapted to engage the edge line of the sheet material.

5. A clip member as recited in claim 1, in which:

the first and second gripping portions define first and second sets of gripping teeth, where the gripping teeth each define first and second slanted surfaces and teeth points; whereby
      when the clip member is in the closed configuration, at least some of the teeth points of the teeth in the first set engage slanted surfaces of the teeth in the second set.

6. A clip member as recited in claim 1, in which:

the first and second gripping portions define first and second sets of gripping teeth, where the gripping teeth are curved; whereby
      when the clip member is in the closed configuration, the gripping teeth engage the sheet material.

* * * * *